United States Patent
Mabboux et al.

(10) Patent No.: US 6,439,467 B2
(45) Date of Patent: Aug. 27, 2002

(54) THERMOSTATIC DEVICE WITH TWO LEVELS OF REGULATION OPERATED SELECTIVELY

(75) Inventors: Lionel Jean Mabboux, Sainte Genevieve des Bois; Claude Henault, St Forget-les-Sablons; René Jean-Claude Mas, Bretigny sur Orge, all of (FR)

(73) Assignee: Vernet S.A., Arpajon (FR)

(*) Notice: Subject to any disclaimer, the term of this patent is extended or adjusted under 35 U.S.C. 154(b) by 0 days.

(21) Appl. No.: 09/783,009

(22) Filed: Feb. 15, 2001

(30) Foreign Application Priority Data

Feb. 28, 2000 (FR) .............................. 00 02474

(51) Int. Cl.[7] .................................. F01P 7/02
(52) U.S. Cl. ......................... 236/34.5; 236/68
(58) Field of Search ............. 236/34, 34.5, 68

(56) References Cited

U.S. PATENT DOCUMENTS 3,768,731 A * 10/1973 Lavado ................... 236/101 B
4,890,790 A * 1/1990 Wagner ..................... 236/34.5
4,961,530 A   10/1990 Wagner
5,195,467 A * 3/1993 Kurz ......................... 123/41.1
5,934,552 A * 8/1999 Kalbacher et al. ......... 236/12.2
5,979,778 A * 11/1999 Saur ......................... 236/34.5
6,065,682 A * 5/2000 Frunzetti ................. 236/12.15

FOREIGN PATENT DOCUMENTS

EP          484 624       5/1992

* cited by examiner

Primary Examiner—William E. Tapolcai
Assistant Examiner—Mohammad M Ali
(74) Attorney, Agent, or Firm—Wenderoth, Lind & Ponack, L.L.P.

(57) ABSTRACT

A thermostatic device comprises a chamber with ports, at least one of which can be closed off by a valve carried by a moving part of a metering thermostatic element. In order to obtain two reliable levels of regulation, and to maintain regulation unless the device is completely destroyed, a duct opening into the chamber via a seat for the valve contains at least one region of a thermostatic element for adjusting the regulation threshold containing selectively operated heating means and comprises a stop for the thermostatic element. The stop can itself move in the direction of movement of the moving part so as to move closer to the seat when the heating means are switched on.

28 Claims, 6 Drawing Sheets

THERMOSTATIC DEVICE WITH TWO LEVELS OF REGULATION OPERATED SELECTIVELY

BACKGROUND OF THE INVENTION

The invention relates to a thermostatic device with two operating thresholds so as to provide two ranges of regulation which can be activated selectively.

Such devices are of use particularly in the field of motor vehicles, to optimize the cooling of the vehicle engine according to the load thereon.

Conventionally, the liquid cooling circuit of internal combustion engines includes a system of pipes connecting the engine to a cooling radiator in which a thermostatic device is inserted. In the liquid bound for the engine, the proportion of so-called "cold" liquid from the radiator and so-called "hot" liquid which has not passed through this radiator is modified by the cooling circuit so as to supply the engine block with cooling liquid at one and the same, theoretically optimum, temperature regardless of the circumstances.

However, it has been found that at very high load, the engine "heats up" in such a way that maintaining the normally optimum temperature at the inlet to the engine leads to an internal temperature thereof which is likely to cause the engine to become damaged.

To avoid this drawback, a temperature lower than the normally optimum temperature is chosen as the liquid inlet temperature. However, at low load, which corresponds to the most frequent usage of the vehicle, the engine runs appreciably below the optimum temperature and the fuel consumption and pollution are increased.

With a view to overcoming this new drawback, the subject of document FR 93/11919 relates to a thermostatic device comprising a single thermostatic element which regulates the temperature by means of a valve and simply offsets the regulation range, when the engine is operating at full load, to then regulate to a lower temperature than the temperature which is optimum under normal conditions (generally approximately at half-load). To this end, the thermostatic element comprises an electrical heating element providing it with additional heating when an appropriately located probe detects that the engine is running near to full load. However, if the thermostatic element fails, it no longer fulfills its regulating function and the regulating valve remains closed, which very soon leads to engine damage.

With a view to avoiding such a drawback, the subjects of documents FR 85/15967 and U.S. Pat. No. 4,875,437 relate to a thermostatic device comprising a regulating element located in the cooling circuit and a heated offsetting element outside the cooling circuit and which is carried by a cap that closes the device and extends transversely to the axis or to the direction of movement of the moving part of the thermostatic element. By virtue of this design, if the heated offsetting element fails, there is still regulation although the offsetting element is subjected to the potentially unfavorable conditions of the surroundings external to the thermostatic device, particularly inclement weather if used on a vehicle. In addition, it is difficult to gain perfect control over the level of temperature of this element. Furthermore, the arrangement adopted does not allow the device to possibly have two ports aligned in the direction in which the axis of movement of the moving part of the regulating element extends, which is what it needs to have given the way in which it is fitted on certain engines.

SUMMARY OF THE INVENTION

In order to overcome these drawbacks and others which will be seen hereinafter, the invention relates to a thermostatic device with two levels of regulation. A fluid-metering moving assembly comprises at least one valve and is designed to move in a chamber which has a first fluid inlet port, a second fluid outlet port, and at least one third port, and at least one of these three ports is surrounded by a valve seat. The metering moving assembly is carried by part of a fluid-metering thermostatic element which can move with respect to another part of the thermostatic element, which part is arranged at least partially outside the chamber. The thermostatic device also includes a housing part in the form of a duct for the passage of cooling fluid, one end of which opens into the chamber via a valve seat surrounding one port of the chamber. The thermostatic device is further characterized in that it also includes a thermostatic element for adjusting the regulation threshold, and has a moving threshold-adjusting part equipped with a moving stop for the part of the metering thermostatic element which is outside the chamber. At least one region of the threshold-adjusting element comprises at least one portion of its fixed part, and at least its moving part extends into the cooling fluid duct The region contains heating means designed to be switched selectively into one of two temperature states such that in the higher temperature state, the distance between the moving stop and the seat via which the duct opens into the chamber, and thus the temperature for which this seat is opened by its valve, are respectively smaller and lower than in the other state.

Thus, with the thermostatic element sheltered from climatic uncertainties, reliable regulation is achieved, and regulation continues to be achieved even in the event of mechanical failure other, of course, than complete destruction of the device. In addition, by virtue of this design, the duct can, if necessary, be straight and connected to a pipe aligned with the direction of movement of the moving assembly. Furthermore, the threshold-adjusting element can itself be carried by a peripheral exterior wall of part of a housing, being partially housed therein. Thus, on the one hand, the dimensions of the device can be appreciably reduced and, on the other hand, any connecting wires there might be for connecting the electrical heating means to a source of power do not have to pass through a stuffing box. Also, the device is simple and quick to mount.

The device may in particular exhibit one or more of the following characteristics.

The threshold-adjusting thermostatic element comprises electrical heating means designed to be electrically connected to a control means comprising a source of electrical power that can be switched on and off selectively.

The source of electrical power can be switched on and off selectively so as to switch the threshold-adjusting thermostatic element into one of a heated state and of a non-heated or less-heated state. Therefore, when the threshold-adjusting element is heated, the distance between the moving stop and the duct-side port seat, and thus the temperature for which this seat is uncovered by its valve, are respectively smaller and lower than when it is not heated or is less heated.

The threshold-adjusting element extends entirely into the duct, and the exterior wall of the duct has a stuffing box passing through it The electrical wires for electrically connecting the heating means to control means comprising a source of electrical power that can be switched on and off, selectively, pass through the stuffing box.

The fixed part of the threshold-adjusting element passes through the exterior wall of the duct and extends in a direction perpendicular to the direction in which the moving part of the metering thermostatic element can move.

The fixed part of the threshold-adjusting element passes through the exterior wall of the duct and extends in a direction which is inclined with respect to the direction in which the moving part of the metering thermostatic element can move.

The fixed part of the threshold-adjusting element passes through the exterior wall of the duct and extends in the same direction as the direction in which the moving part of the metering thermostatic element can move.

The threshold-adjusting element comprises a fixed part, a portion of which extends approximately transversely into the internal space of the duct The duct is centered on a longitudinal axis on which the valve seat via which one end of the duct opens into the chamber is centered. The moving part of the metering thermostatic element which carries the moving assembly comprising the valve for this seat can move in terms of translation along this axis.

The duct is bent, and the means of heating the threshold-adjusting element extends into the fixed part of this element, in the direction in which this fixed part passes through the exterior wall of the duct.

The means of heating the threshold-adjusting element extends in the direction in which the moving part of the metering thermostatic element can move.

The heating means comprises a wound electrical resistive element, and the electrical heating means comprises an electrical resistive element printed onto an insulating wafer. The electrical heating means also may comprise an electrical resistive element consisting of a resistive rod.

The heating means comprises an electrical resistive element housed in a compartment containing a mass of expanding wax of a housing belonging to the fixed part of the threshold-adjusting element.

The fixed part of the threshold-adjusting element comprises a housing which has a compartment containing a mass of expanding wax. The housing has, facing the seat, an opening which is closed off by a diaphragm.

The threshold-adjusting element comprises a diaphragm in the shape of a bell known as a "bag diaphragm", or the threshold-adjusting element can comprise a flat diaphragm.

The duct comprises two abutting portions fixed together, and the facing respective mating surfaces of the abutting portions have cut-outs in which a region of the threshold-adjusting element is inserted.

The fluid-metering moving assembly comprises at least two valves, and at least two of the at least three ports are surrounded by respective seats for the two valves so that when any one of the valves leaves its seat and moves away from it, the other moves closer to its seat, possibly to the point of closing it off.

The electrical heating means is connected by electrical wires to a source of electrical power also connected to a temperature-detecting probe designed to detect the temperature of a liquid.

The electrical heating means is connected by electrical wires to a source of electrical power is also connected to a temperature-detecting probe designed to detect the temperature of a liquid and to an alarm so that when the probe detects a temperature at least equal to a predetermined safe temperature, the source of electrical power is switched on. Thus on the one hand, the adjusting element is electrically heated and the device regulates in a low range of temperatures and, on the other hand, the alarm is activated.

The chamber has an outlet port surrounded by a seat made in the duct for a valve, an outlet port possibly surrounded by a seat for a valve, and an inlet port.

The inlet port is an inlet port for hot liquid from an engine, for example, of a vehicle. The outlet ports are outlet ports for hot liquid designed to be connected respectively to an inlet of a cooling radiator and to an inlet of the engine, possibly via a circulating pump.

The chamber has an inlet port surrounded by a seat made in the duct for a valve, an inlet port possibly surrounded by a seat for a valve, and an outlet port.

The inlet port surrounded by a seat made in the duct is an inlet port for cold liquid designed to be connected to a cooling radiator, for example, of a vehicle. The other inlet port is an inlet port for hot liquid from an engine of the vehicle, and the outlet port is an outlet port for hot liquid or cold liquid or a mixture of hot liquid and cold liquid depending on the position of the metering thermostatic element.

BRIEF DESCRIPTION OF THE DRAWINGS

Other characteristics and advantages of the invention will become apparent from the description which will follow of some embodiments of the invention which are given by way of non-limiting examples and which are depicted in the appended drawings, in which.

DETAILED DESCRIPTION OF THE INVENTION

In the figures, in order not to overload the drawing, a great many components and lines relating to components which are behind the cutting plane have not been depicted, but the way in which the device according to the invention is arranged will be made easier to understand by the description which will follow.

The thermostatic device depicted comprises, in the known way, various members housed in a housing formed by a duct or pipe 1 which may, as desired, be straight (FIGS. 1, 2, 5, 6, 9 and 10) or alternatively bent (FIGS. 11 and 12) and by a body 2 which may consist of a region of a vehicle engine surrounding a chamber 3 through which the cooling liquid passes made in this region and in which various fluid circulation passages terminate, as will be seen later. The duct 1 is fixed to the body 2, for example, by screws.

In this instance, the duct 1 and the chamber 3 have an overall shape which has symmetry of revolution (cross-sectional symmetry) with approximately circular cross section, and they extend in alignment along the same central longitudinal axis in a first direction.

The chamber 3 comprises at least three ports 4, 5, 6, the function of which depends on the way in which the device is used and in particular on the way in which it is installed in the engine cooling circuit. A first port is an inlet port for a so-called "hot" fluid from the engine, a second port is a fluid outlet port for emptying from the chamber the proportion of the fluid that is intended to be sent to the engine, generally via a circulating pump, and a third port, connected to a cooling radiator, may, depending on the way in which the device is installed in the cooling circuit, be a "hot" fluid outlet port connected to the inlet of the radiator or a "cooled" or "cold" fluid inlet port connected to the radiator outlet. A fourth port may, in some instances, be connected to various items of the apparatus, such as a unit heater or heat exchangers. One of the end regions of the duct 1 opens into the chamber 3, entering the latter, and it is the corresponding orifice which constitutes the third fluid port The first and second ports 4, 5, respectively, are the mouths of two passages ending in the chamber, one opposite the third port 6 and centered on the central axis of the device, and the other laterally.

Housed at least partially inside the chamber 3 is a part, able to move in translation in the first direction, of a thermostatic element 7 (formed of, in this case wax). The element 7 is carried and guided in a carrier 8 extending in this chamber 3, and the carrier is attached to the end region of the duct 1 which opens into the chamber. This moving part of the thermostatic element 7 carries a moving assembly comprising at least one valve 9, in this instance two valves 9, 10, arranged to bear respectively against flanges of the opposed end regions of this moving part of the thermostatic element These two valves 9, 10 are slipped around the moving part of the thermostatic element and urged towards their respective flanges by one end of an elastic member such as a spring 11, 12. The opposite end of spring 11 presses against the carrier 8, and the opposite end of spring 12 presses against a shoulder 13 of the moving part of the body of the thermostatic element.

At least one and, in this instance, two, of the at least three ports of the chamber are surrounded by respective seats 14, 15 in the case of the two valves 9, 10, centered on the longitudinal axis of the duct 1. With the structure chosen here, one of these ports is the third port 6, whose seat 14, machined in the end region of the duct 1, is frustoconical and widens towards the inside of the chamber 3. The port 6 is designed to take a valve 9 of corresponding shape near to part of the thermostatic element 7 which is arranged at least partially (in this instance fully) outside the chamber or, more precisely, in the duct 1. Customarily, the valve 9 is known as the "fixed part", but in this instance, the valve 9 can also move in the first direction as will be seen later on. The other port, the port 4, consists of the mouth of the passage centered on the axis of the device, whose seat 15, machined in the body 2, is flat and extends at right angles to the central axis of the device. This port 4 is designed to take a flat valve near the free end of the moving part of the thermostatic element. It may be noted that the customarily fixed part of the thermostatic element 7 here consists of a piston mounted to slide in a cup containing a wax which can expand very significantly in the presence of heat.

The two valves 9, 10 are mounted near the two opposed ends of the part of the thermostatic element 7 which can move in translation along the longitudinal axis in the chamber 3, respectively, and between their two respective seats 14, 15. Therefore, when either one of the two valves leaves its seat and moves away from the seat, the other valve moves closer to its seat with the possibility of seating on it if the amplitude of the movement is sufficient. The cylindrical spring 11 of the frustoconical valve 9 bearing against the fixed carrier 8 is compressed when this valve moves away from its seat. The frustoconical spring 12 of the flat valve 10 bearing against the shoulder 13 is compressed when, with valve 10 in abutment, the translational movement continues so as to act as an overtravel spring.

Thus, assuming that the part of the thermostatic element 7 which is inside the duct 1 is kept fixed by means of a stop 16, this arrangement makes it possible, if the two valve-controlled ports 4, 6 are outlets and at least one other port 5 is an inlet, for the relative outlet flows to be metered. If the two valve-controlled ports 4, 6 are inlets and at least one other port 5 is an outlet, for the proportions of the inlet flows in the outlet flow to be metered. In either instance, an operating level is thus obtained which is determined by the location of the stop 16, characterized by the distance L separating an abutment surface for the so-called fixed part of the metering thermostatic element 7 from the bearing region of the seat 14 for the frustoconical valve 9, this distance being known as the "throw" of the thermostatic device. The magnitude of the throw determines the triggering threshold of the thermostatic device, that is to say the temperature for which the frustoconical valve leaves its seat It will be noted that the same line of reasoning applies in the case where a single port is equipped with a seat that can be blocked by a valve. In this instance, the port 6 is equipped with a seat 14 that can be closed off by the frustoconical valve 9, simply with slightly inferior effectiveness.

So, according to the invention, in order to obtain two levels of operation of the thermostatic device and, more particularly, of the fluid-metering thermostatic element 7 and of the fluid-metering moving assembly it carries, the throw of the device and, for that, the location of the stop 16 in the duct 1 along the longitudinal axis of the metering element, is modified selectively. Thus, the so-called fixed part of the thermostatic element 7 can move according to the location of the stop 16. Hence, to selectively obtain two levels of operation corresponding to two different triggering thresholds, all that is required is for two possible locations to be provided for the stop 16.

For this purpose, an element 17 for adjusting the regulation threshold, in this instance consisting of another wax-operated thermostatic element, is arranged in the duct 1. This other element comprises a (truly) fixed part extending, if the duct is straight or bent at an obtuse angle, generally in a second direction different from the first direction, and a part that can move in the first direction and which is equipped with a piston constituting the moving stop 16 for the so-called fixed part of the fluid-metering thermostatic element 7. However, as will be seen later, particularly if the duct 1 is bent at right angles, the fixed part of the adjusting element 17 may extend in the first direction, like the moving part. This other threshold-adjusting thermostatic element 17, various possible embodiments of which are depicted in FIGS. 3A to 4C, comprises, for actuating its moving part, an electrical heating means preferably consisting of an electrical resistive element 18 or thermistor known in the art by the name of PTC. The electrical resistive element is connected by external electrical wires 19 to operating means here consisting of a source of power which can be switched on and off selectively so that the thermostatic element 17 can be selectively heated.

The threshold-adjusting thermostatic element 17 is supported by a wall, generally the annular peripheral wall, of the duct 1. Thus, a region of this peripheral exterior wall has, passing right through it, a region of the fixed part extending in the second direction, of the element 17, near one of the ends of the element. Another, approximately central, region of the threshold-adjusting element 17 passes transversely through the interior space of the duct, in this instance along a diameter thereof. The interior surface of the region of the duct which is diametrically opposite the one through which the threshold-adjusting element passes has a cavity in which the opposite end region of this element is positioned.

The moving part of the threshold-adjusting element extends along the central longitudinal axis of the duct 1, is centered on it, and is designed to move along the axis. This axis is also the one on which the valve seat or seats 14, 15 and the part capable of longitudinal translation of the metering thermostatic element 7, which carries the moving assembly comprising the valve or valves 9, 10 are centered.

Figure 1:
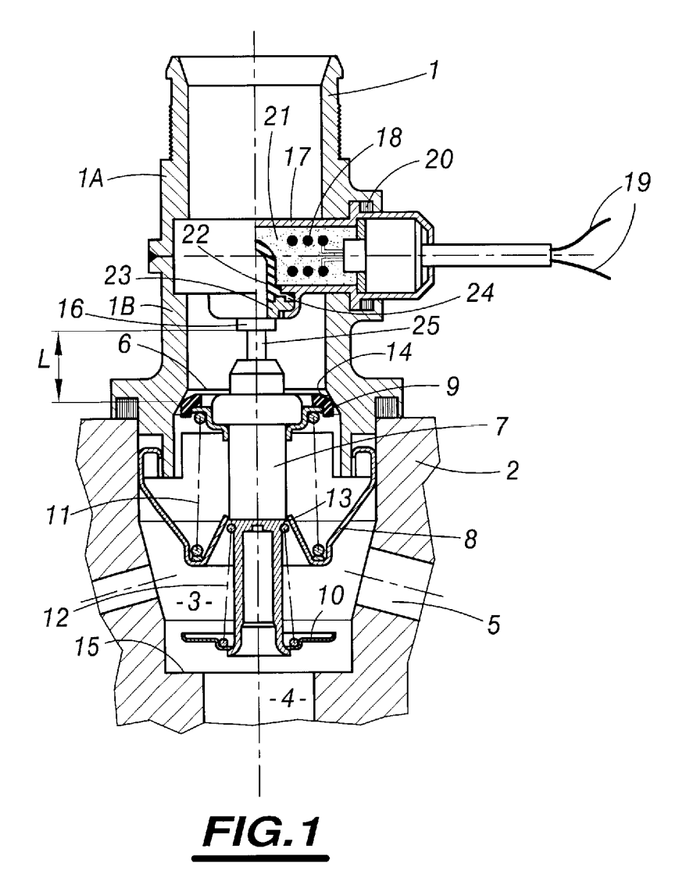
FIG. 1 is a view in longitudinal section of a device according to the invention.
Figure 2:
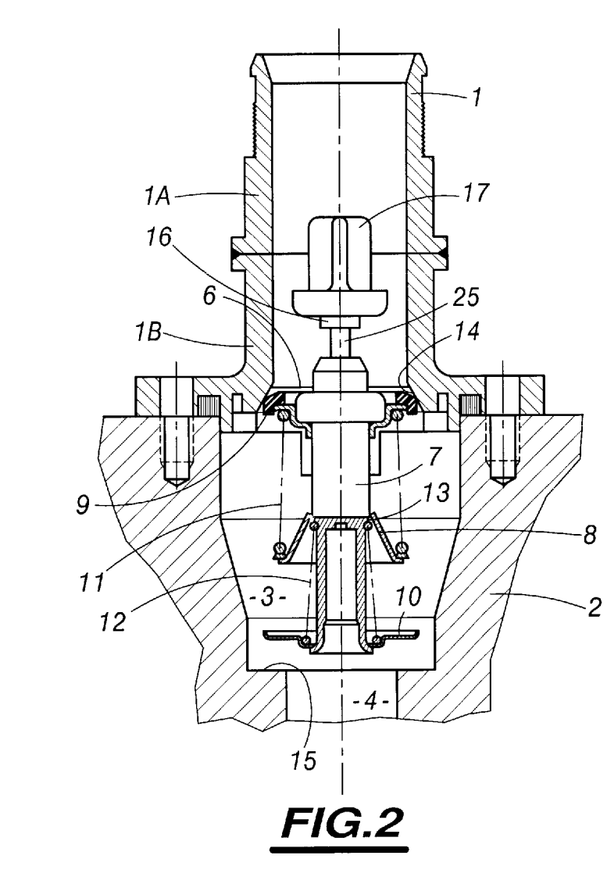
FIG. 2 is another view in longitudinal section of the device according to the invention, on a plane perpendicular to the plane of section of FIG. 1.
Figure 3A:
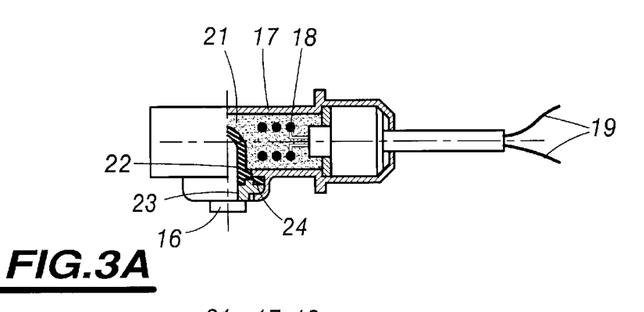
FIGS. 3A, 3B, 3C are longitudinal sections of three exemplary embodiments of a thermostatic element for adjusting the regulation threshold designed to be fitted to a device according to the invention.
Figure 3B:
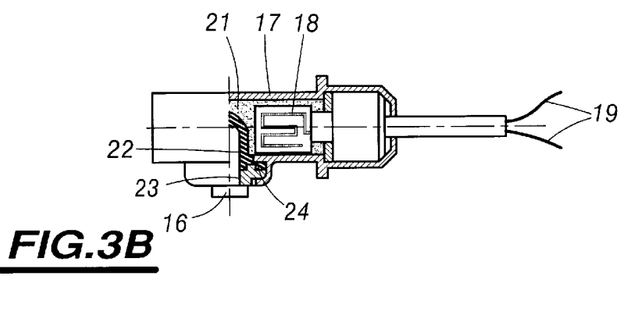
Figure 3C:
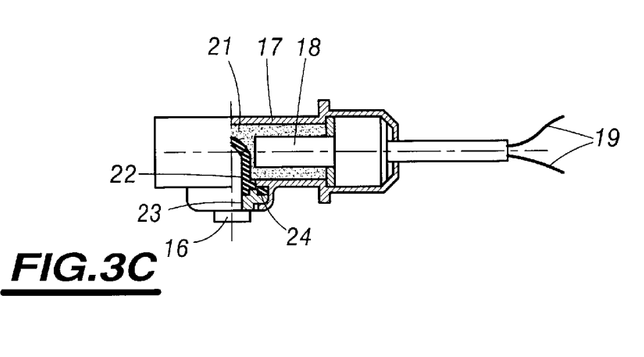
Figure 4A:
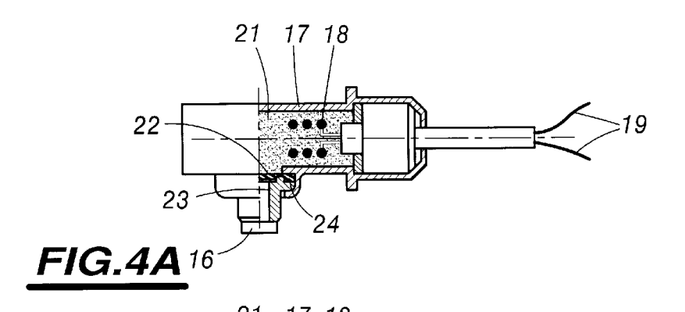
FIGS. 4A, 4B, 4C are longitudinal sections of three other exemplary embodiments of a thermostatic element for adjusting the regulation threshold designed to be fitted to a device according to the invention.
Figure 4B:
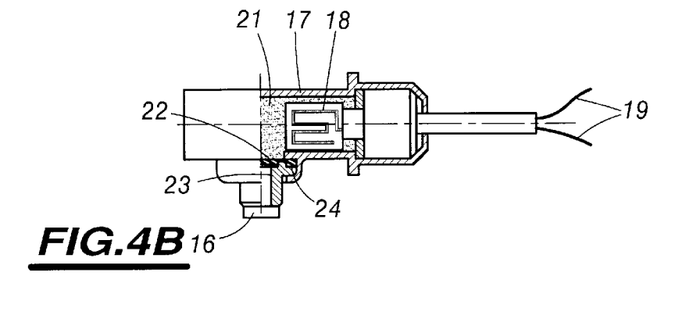
Figure 4C:
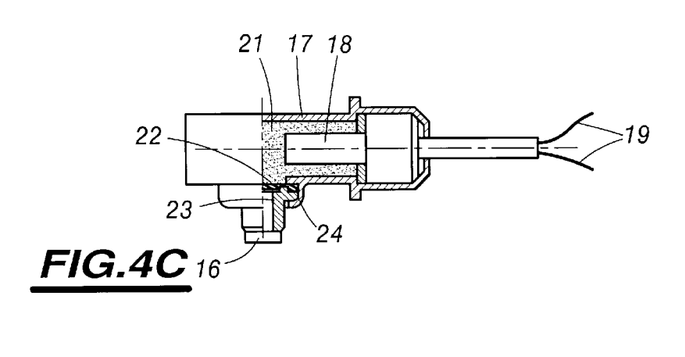

In the embodiment depicted in FIGS. 1 and 2, in order to allow the threshold-adjusting element 17 to be mounted, the duct 1 has two abutting portions 1A, 1B, the opposed respective mating surfaces of which have cut-outs in which this thermostatic element 17 is housed and which have been fixed together. However, it is possible to have a one-piece duct, as long as the external shape of the threshold-adjusting element is designed accordingly.

In this particular instance in which the threshold-adjusting element is a thermostatic element, the latter comprises (FIGS. 3A to 4C), by way of fixed part, a housing which, externally, in its region passing through the duct, has a positioning flange designed to be inserted in semicircular cut-outs cut facing each other in the respective peripheral walls of the two duct portions 1A, 1B, with the insertion of a compressible sealing and looseness-or play-compensation washer 20. Internally, the housing has two compartments following on from one another along a main axis which here is coincident with a diameter of the duct 1, partitioned from one another at the flange by means of a disc which has a central opening. In a first one of the compartments extending in a region of the housing which partially projects out of the duct 1, the external electrical wires 19 are electrically connected to the power supply conductors of the electrical resistive element 18, the heating region of which is placed in the second compartment which extends into the internal space of the duct. The power supply conductors pass from the first compartment to the second through the central opening in the partitioning disc, which opening is fitted with sealing means which prevents the wax located in the second compartment from passing. Inside the second compartment which extends diametrically across the internal space of the duct 1, the electrical resistive element 18, for example a helically wound component known commercially by the name of Thermocoax® (FIGS. 3A and 4A) or a resistive element printed onto an insulating wafer (FIGS. 3B and 4B) or alternatively a resistive rod (FIGS. 3C and 4C), is embedded in a mass of expanding wax 21. In its side wall, this second compartment has a circular opening centered on the longitudinal axis of the duct 1, formed in that region of the housing which faces the valve seat or seats 14, 15, and is closed off by a flexible deformable diaphragm 22. The diaphragm 22 can have the shape of a bell known as a "bag diaphragm" (FIGS. 3A, 3B, 3C) projecting into the second compartment and constituting, with the piston that forms the stop 16, the moving part of the threshold-adjusting element 17 and which is fixed, by its periphery that forms the flange, to the housing. As an alternative, the diaphragm 22 may be a diaphragm of the so-called "flat" type (FIGS. 4A, 4B, 4C), which is more reliable and, if necessary, enables the lengthwise bulk of the threshold-adjusting element 17 to be reduced. To attach the diaphragm, the housing has, around this opening, a double wall delimiting an annular cavity in which the peripheral flange of the diaphragm 22, a peripheral flange of a diaphragm centering and backing piece 23, and a sealing bead 24 made as one piece with the peripheral flange of the diaphragm 22 are housed. In the embodiment of FIGS. 1 and 2, on the same side as the chamber 3, the flexible diaphragm 22 forms a receptacle for the piston that forms a stop for the so-called fixed part of the metering thermostatic element 7 consisting of the piston 25 thereof. As an alternative, however, the stop could consist of the end of the diaphragm 22, and the metering thermostatic element would then be equipped with a long piston 25 extending as far as the end of the flexible diaphragm 22. To avoid any damage to the end of the diaphragm 22 in the event of great expansion of the wax of the metering thermostatic element 7, the piston of the threshold-adjusting element 17 has a flange-shaped region designed to bear against the diaphragm backing piece 23 when the diaphragm 22 is in the retracted position. It is the location of the free end surface of this flange which constitutes the stop surface that defines the value of the throw L of the device. Furthermore, as the diaphragm backing piece 23 is made of a rigid material, it plays a part in guiding the piston that forms the stop 16 in the threshold-adjusting element 17.

The result of this arrangement is that when the threshold-adjusting element 17 is heated, the expansion of the mass of wax 21 pushes the diaphragm 22 back along an axis which in this instance is perpendicular to the main axis of the element, towards the chamber 3, and the moving stop 16 for the fluid-metering thermostatic element 7 thus moves in this direction. This results in a reduction in the throw L of this thermostatic element 7. Thus, a smaller amount of expansion, and therefore a lower temperature, of the element 7 is enough for the frustoconical valve 9 to leave its seat 14 and for the flat valve, if there is one, to move closer to its seat. When the threshold-adjusting element 17 is deactivated, the diaphragm 22 retracts, the throw of the metering thermostatic element 7 is lengthened, and greater expansion and therefore a higher temperature of the metering thermostatic element is needed to cause the frustoconical valve 9 to lift off its seat 14.

The thermostatic device with two levels of regulation which has just been described can be used in a combustion engine cooling circuit, for example of a vehicle, in various ways.

Figure 5:
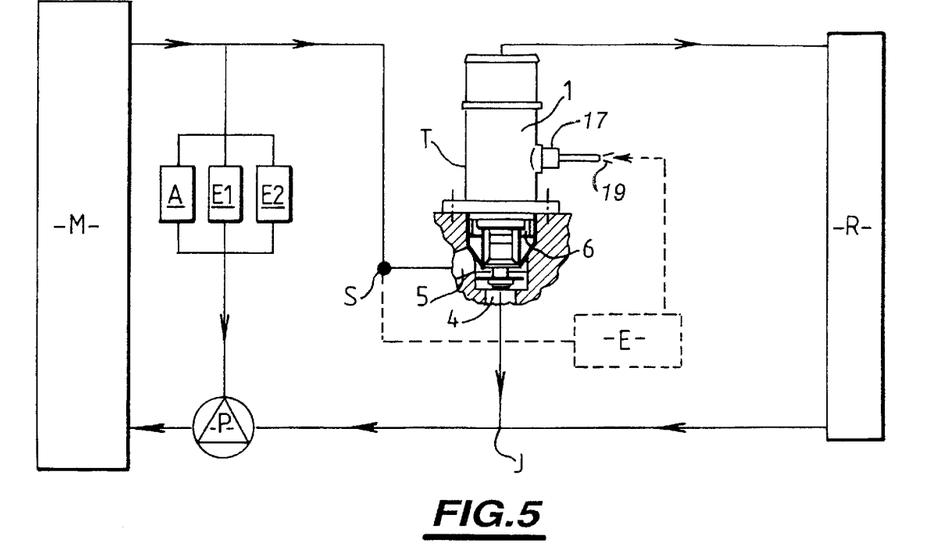
FIG. 5 schematically shows the mounting of the device of FIGS. 1 and 2 in a cooling circuit of a vehicle with a combustion engine.

FIG. 5 shows a thermostatic device T as described hereinabove in a so-called "engine outlet" mounting.

More specifically, the valveless port 5 of the thermostatic device T is an inlet connected to the cooling liquid outlet of an engine M and is therefore fed with hot liquid. The port 6 controlled by a frustoconical valve is an outlet connected to the inlet of a cooling radiator R to which it transmits hot liquid that is to be cooled. The port 4 with a flat valve or with no valve is a hot liquid outlet connected to an inlet of a circulating pump P, the outlet of which is connected to the cooling liquid inlet of the engine. The port 4 transmits to pump P some of the hot liquid from the port 5 according to the position of the metering thermostatic element 7, to which cooled liquid from the radiator R has been added at a junction member J which is connected to the thermostatic device T and to the radiator R. Inserted in one or more branches connected, at one end, to the line connecting the engine outlet and the valveless inlet port 5 and, at the other end, to an additional inlet of the pump P, are a unit heater A and heat exchangers E1, E2 for gearbox oil and engine oil respectively. An electronic control and power supply unit E is electrically connected, on the one hand, to a temperature probe S detecting the temperature of the hot liquid from the engine going to the thermostatic device T and, on the other hand, to the thermostatic device T via wires 19 so as selectively supply the threshold-adjusting thermostatic element 7 with its heating energy, according to the temperature detected. The unit E is preferably also connected to an alarm (not depicted) visible and/or audible to the driver of the vehicle and intended to be activated by the unit E when the probe S detects a temperature at least equal to a predetermined safe temperature.

Figure 6:
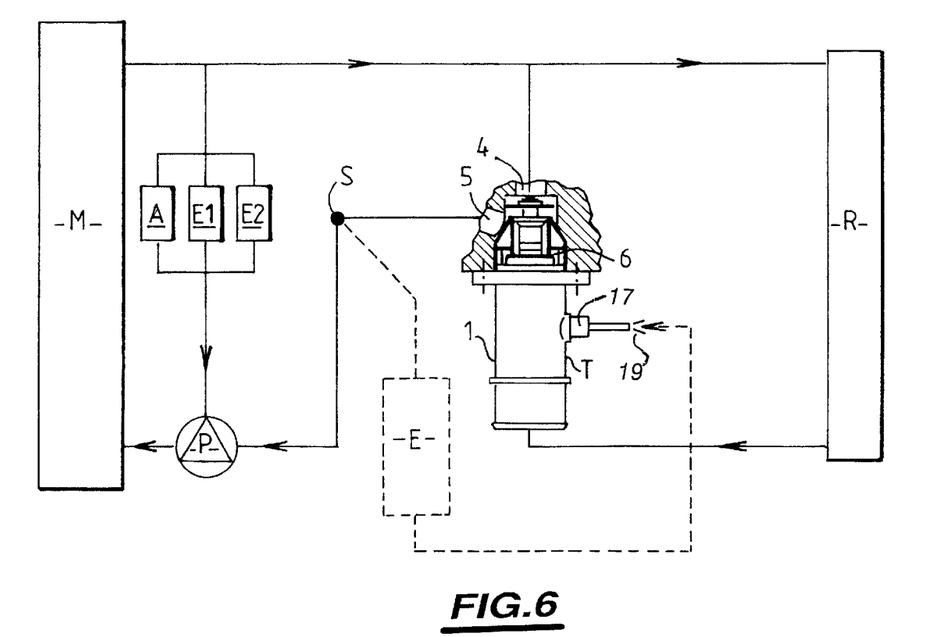
FIG. 6 schematically shows an alternative form of the mounting of FIG. 5.

FIG. 6 shows a thermostatic device as described hereinabove in a so-called "engine inlet" mounting (the same numerical references denote the same elements as before).

The port 4 with a flat valve or no valve is an inlet connected to the cooling liquid outlet of an engine M, to which outlet the inlet of a cooling radiator R is also connected to receive hot liquid therefrom. The port 6 controlled by a frustoconical valve is an inlet connected to the outlet of the cooling radiator R so as to receive cold liquid therefrom. The valveless port 5 is an outlet for liquid which may thus be a mixture of hot liquid and of cold liquid, or for hot liquid or for cold liquid, connected to one inlet of a circulating pump P. The outlet of pump P is connected to the cooling liquid inlet of the engine to transmit to it liquid whose temperature depends on the position of the metering thermostatic element 7. Inserted in one or more branches connected, at one end, to the line connecting the engine outlet and the inlet port 4 with a flat valve or no valve, and, at the other end, to an additional inlet of the pump P, are a unit heater A and exchangers E1, E2 for gearbox oil and engine oil respectively. An electronic control and power supply unit E is electrically connected, on the one hand, to a temperature probe S detecting the temperature of the liquid going to the engine and coming from the thermostatic device T and, on the other hand, to the thermostatic device T via wires 19 so as selectively supply the threshold-adjusting thermostatic element 17 with its heating energy, according to the temperature detected. The unit E is preferably also connected to an alarm (not depicted) visible and/or audible to the driver and intended to be activated by the unit E when the probe S detects a temperature at least equal to a predetermined safe temperature.

Thus, in the two types of mounting of FIGS. 5 and 6, electrical heating is used to regulate at low temperature when the engine is at full load.

Figure 7:
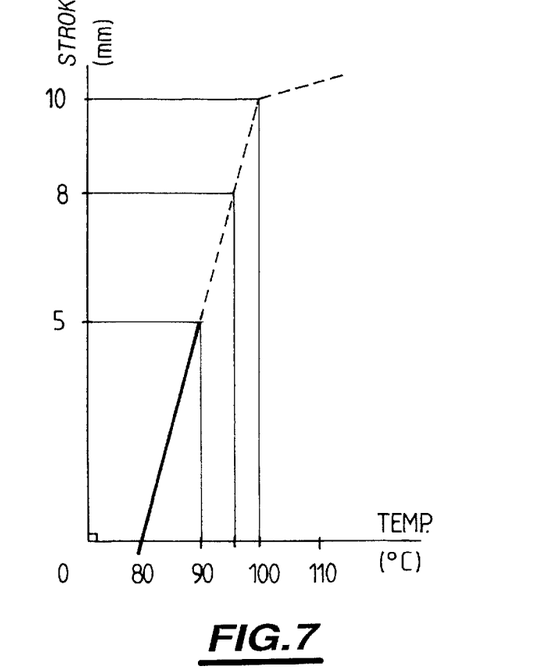
FIGS. 7 and 8 are diagrams illustrating the operation of the device according to the invention in the cooling circuits depicted schematically in FIGS. 5 and 6.
Figure 8:
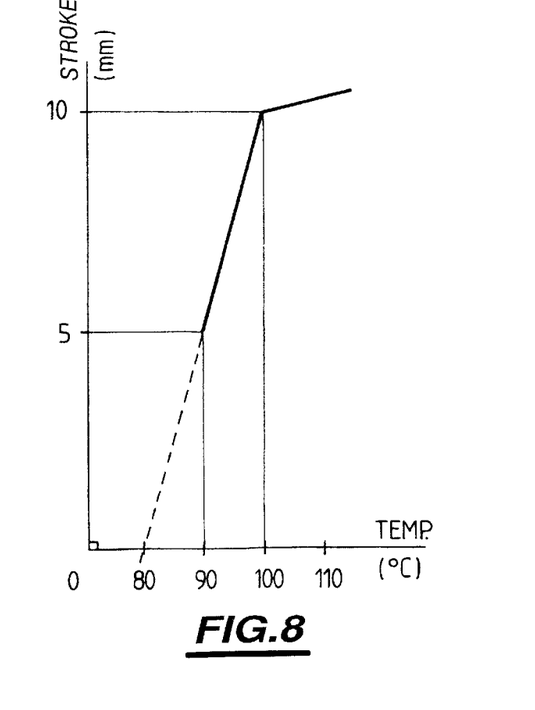

FIGS. 7 and 8 illustrate an exemplary form of operation of the thermostatic device according to the invention, whether this be in the setup of FIG. 5 or that of FIG. 6. These figures also show the curve of metering element piston elongation travel against regulation temperature for, on the one hand, low-temperature regulation (FIG. 7: engine at full load, threshold-adjusting element heated) and, on the other hand, high-temperature regulation (FIG. 8: engine at half load, threshold-adjusting element not heated).

If, with the engine operating at full load, the threshold-adjusting element 17 is heated, the elongation travel of the piston from its retracted position is five millimeters, which corresponds to a regulated temperature T1 as identified by the probe S of FIG. 6, lying in a low range from 80° C. to 90° C. If, with the engine operating at half load, the threshold-adjusting element 17 is not heated, the elongation travel of the piston is also five millimeters, but starting from after the five millimeters of the previous travel, which corresponds to a regulated temperature T2 as identified by the probe S in FIG. 6, lying in a high range from 90° C to 112° C.

Still in the same example, a safe temperature T3 is chosen which is higher than the high range, for example T3=113° C., for which, if this temperature is detected by the probe S, there is an automatic switch back to low-temperature regulation regardless of the engine load conditions and an alarm is triggered, this alarm also being connected to the electronic unit E, and which is visible and/or audible to the driver of the vehicle. If the probe S detects a temperature at least equal to T3, the electrical power to the adjusting element 17 is switched on, the adjusting element is electrically heated and the alarm is also activated.

Thus, in most instances of failure of the thermostatic device T, a cooling liquid is introduced into the engine at a temperature appropriate to full-load engine operation, and the risk of engine damage is thus limited.

Of course, the invention is not restricted to the embodiments described in detail in the foregoing and others could be envisaged without departing from its scope. FIGS. 9 to 12, in which the elements which correspond to elements visible in the preceding figures carry the same numerical references, show such other embodiments.

Figure 9:
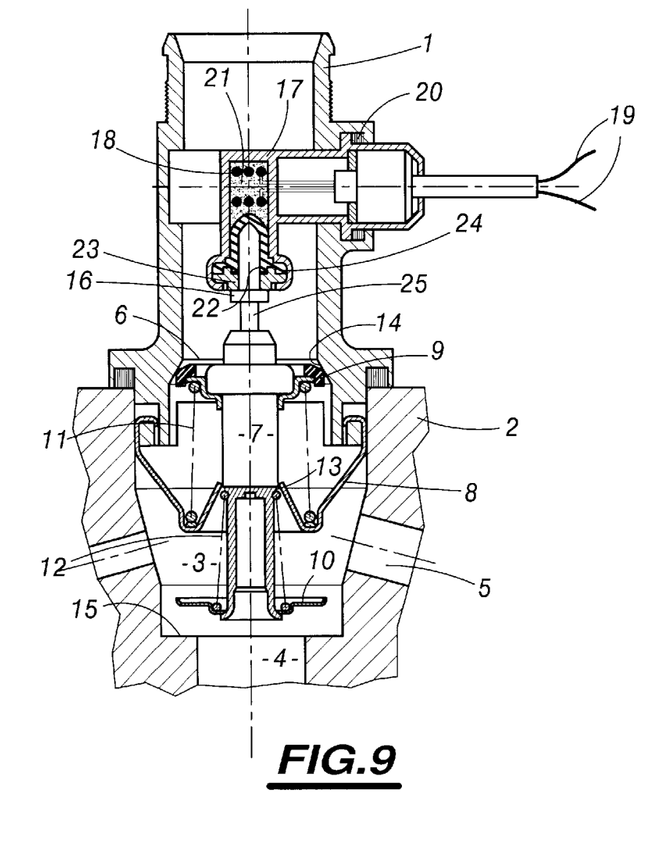
FIGS. 9 to 12 are views in longitudinal section corresponding to that of FIG. 1, of four variants of the embodiment of the device of FIGS. 1 and 2.

For example, FIG. 9 shows an embodiment very similar to that of FIGS. 1 and 2, in which the threshold-adjusting element 17 is slightly different from those described and depicted earlier. Specifically, in the embodiments previously described and depicted, the second compartment of the threshold-adjusting element in which the electrical resistive element 18 is located extends across a portion of the fixed part of the element which projects partially out of the duct 1, and extends across the main axis of the housing, therefore along a diameter of the duct. By contrast, in the embodiment of FIG. 9, this compartment extends at right angles to the main axis of the housing, and therefore in the first direction (along the longitudinal axis) of the device, in the continuation of the flexible diaphragm 22.

Figure 10:
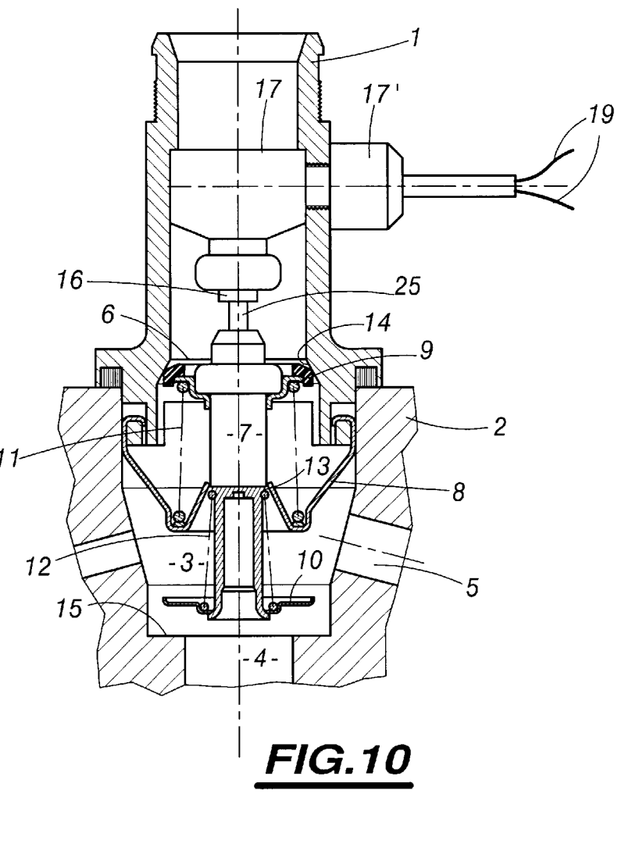

FIG. 10 shows an embodiment which is also very similar to that of FIGS. 1 and 2, but in which the threshold-adjusting element 17 is entirely housed in the duct 1, the main axis of its housing extending in the first direction (along the longitudinal axis) of the device rather than across the diameter of the duct 1. As the threshold-adjusting element has no region passing through the exterior wall of the duct 1, this wall has a stuffing box 17' passing through it to which the element 17 is fixed, the stuffing box itself having the electrical wires 19 passing longitudinally through it electrically connecting the resistive element to the control means.

Figure 11:
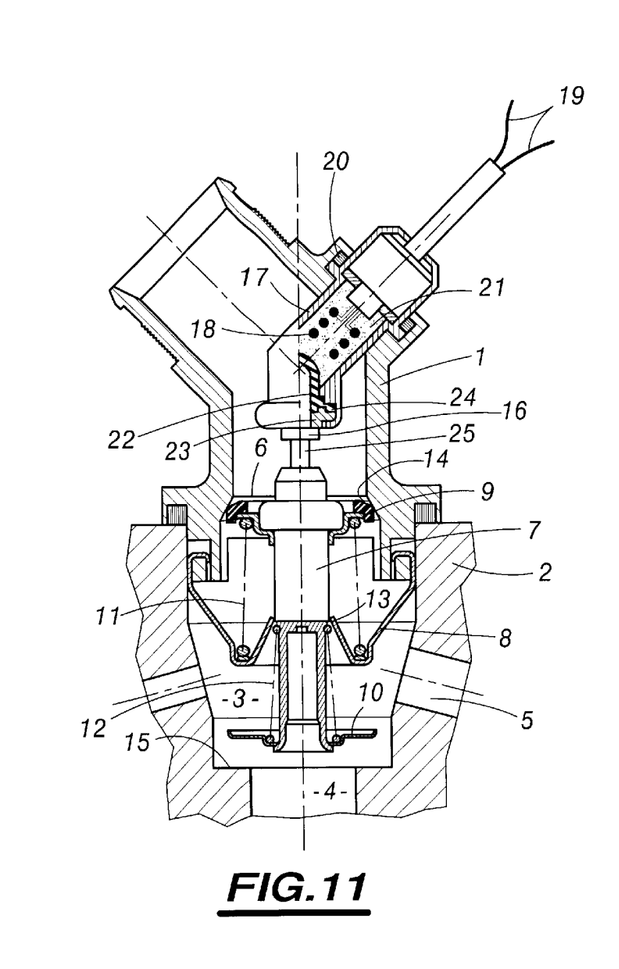

FIG. 11 shows an embodiment in which the duct 1 is bent at an obtuse angle (approximately 135°), and the threshold-adjusting element 17 is supported by the exterior wall of this duct 1. This threshold-adjusting element 17, the structure of which is generally similar to that of the element of FIGS. 1, 2, 3A and 4A, is itself bent at 135° rather than 90° as in FIGS. 1 and 2. More precisely, the fixed part of the threshold-adjusting element 17 passing through the exterior wall of the duct 1 extends in a direction inclined at 45° with respect to the direction in which the moving part of the metering thermostatic element 7 can move. As a variant, the threshold-adjusting element 17 could be straight or alternatively bent at 90° if it were supported by the exterior wall of the lower part of the duct 1. Here again, as the region of the element 17 containing the heating means is not outside the duct 1, the operation of the device is not dependent on the climatic conditions.

Figure 12:
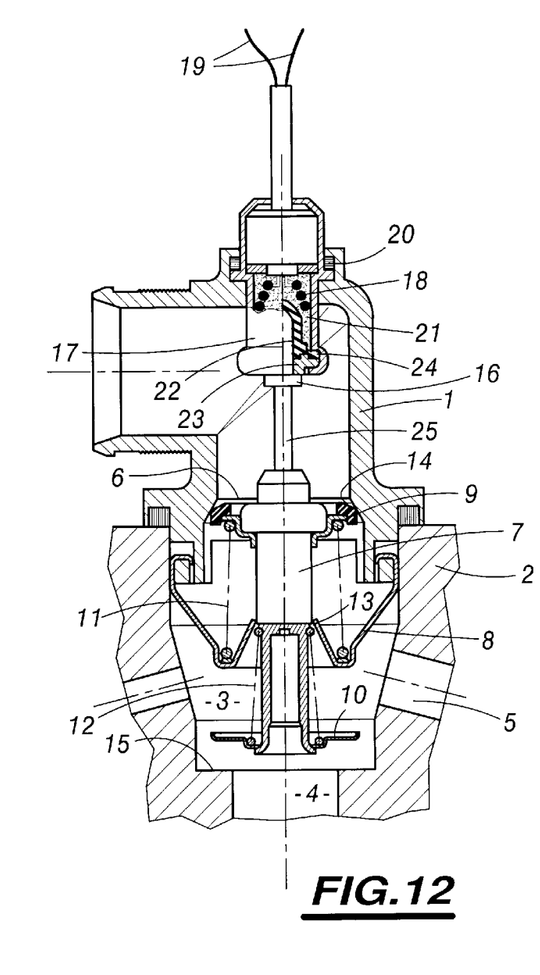

FIG. 12 shows a form of embodiment in which the duct 1 is bent at right angles and the threshold-adjusting element 17, being straight, passes through the exterior wall of the duct 1 and extends in the same direction as the direction in which the moving part of the metering thermostatic element can move (i.e., along the longitudinal axis of the device), the element 17 being supported by the exterior wall of the upper part of the duct 1. Here again, as an the region of the element 17 containing the heating means is not outside the duct 1, the operation of the device is not dependent on the climatic conditions.

What is claimed is:

1. A thermostatic device comprising:
    a chamber having a first fluid inlet port, a second fluid outlet port, and a third port, said chamber having a valve seat around at least one of said first fluid inlet port, said second fluid outlet port, and said third port;
    a fluid-metering assembly including a valve and being operable to move within said chamber;
    a fluid-metering thermostatic element having a first part and a second part movable with respect to said first part, said second part being arranged so as to carry said fluid-metering assembly and being arranged at least partially outside of said chamber;
    a duct for allowing passage of cooling fluid therethrough, said duct having an end communicating with said chamber via said valve seat around said at least one of said first fluid inlet port, said second fluid outlet port, and said third port; and
    a regulating threshold-adjustment thermostatic element including a fixed part and a moving part, said moving part having a stop for limiting an amount of movement of said second part of said fluid-metering thermostatic element, an insertion region of said regulating threshold-adjustment thermostatic element comprising said moving part and at least a portion of said fixed part and containing a heating member, said regulating threshold-adjustment thermostatic element being arranged such that said insertion region containing said heating member is located within said duct;
    wherein said heating member is operable to be switched between heating states so as to switch said insertion region between a high temperature state, wherein said stop extends further outward from said fixed part so as to be located closer to said valve seat through which said end of said duct communicates with said chamber, and a low temperature state, wherein said stop is located farther from said valve seat through which said end of said duct communicates with said chamber than when said insertion region is in said high temperature state.

2. The thermostatic device of claim 1, wherein said heating member of said regulating threshold-adjustment thermostatic element comprises an electrical heating member electrically connected to a controller including a power source operable to selectively supply power to said electrical heating member.

3. The thermostatic device of claim 2, wherein said power source is operable to selectively supply power to said electrical heating member so as to switch said electrical heating member between a high heating state, wherein a distance between said stop and said valve seat through which said end of said duct communicates with said chamber is small, and a low heating state, wherein the distance between said stop and said valve seat through which said end of said duct communicates with said chamber is larger than when said electrical heating member is in said high heating state.

4. The thermostatic device of claim 3, wherein said fluid-metering thermostatic element, said fluid-metering assembly, and said regulating threshold-adjustment thermostatic element are arranged such that when said electrical heating member is in said high heating state, said stop is located with respect to said second part of said fluid-metering thermostatic element such that a temperature necessary for said fluid-metering thermostatic element to move said valve of said fluid metering assembly off of said valve seat is less than a temperature necessary when said electrical heating member is in said low heating state.

5. The thermostatic device of claim 1, wherein said regulating threshold-adjustment thermostatic element is located entirely in said duct, a peripheral wall of said duct having a stuffing box to allow passage of electrical wires for electrically connecting said heating member to a controller including a power source operable to selectively supply power to said heating member.

6. The thermostatic device of claim 1, wherein said fixed part of said regulating threshold-adjustment thermostatic element extends through a peripheral wall of said duct and extends along a direction perpendicular to a direction of movement of said second part of said fluid-metering thermostatic element.

7. The thermostatic device of claim 1, wherein said fixed part of said regulating threshold-adjustment thermostatic element extends through a peripheral wall of said duct and extends along a direction inclined with respect to a direction of movement of said second part of said fluid metering thermostatic element.

8. The thermostatic device of claim 1, wherein said fixed part of said regulating threshold-adjustment thermostatic element extends through a peripheral wall of said duct and extends along the same direction as a direction of movement of said second part of said fluid-metering thermostatic element.

9. The thermostatic device of claim 1, wherein a portion of said fixed part of said regulating threshold-adjustment thermostatic element transversely extends into an inner space of said duct.

10. The thermostatic device of claim 1, wherein a central axis of said duct is coaxial with a central axis of said valve seat around said at least one of said first fluid inlet port, said second fluid outlet port, and said third port and through which said end of said duct communicates with said chamber, said second part of said fluid-metering thermostatic element being operable to move along an axis coaxial with said central axis of valve seat and said central axis of said duct.

11. The thermostatic device of claim 1, wherein said duct is bent.

12. The thermostatic device of claim 1, wherein said heating member extends into said fixed part of said regulating threshold-adjustment thermostatic element and is arranged so as to extend in a direction in which said fixed part passes through a peripheral wall of said duct.

13. The thermostatic device of claim 1, wherein said heating member is arranged so as to extend in a direction in which said second part of said fluid-metering thermostatic element is operable to move.

14. The thermostatic device of claim 1, wherein said heating member comprises a wound electrical resistive element.

15. The thermostatic device of claim 1, wherein said heating member comprises an electrical resistive element printed onto an insulating wafer.

16. The thermostatic device of claim 1, wherein said heating member comprises an electrical resistive rod element.

17. The thermostatic device of claim 1, wherein said heating member comprises an electrical resistive element housed in a compartment of said fixed part, said compartment containing expanding wax surrounding said electrical resistive element.

18. The thermostatic device of claim 1, wherein said fixed part includes a compartment filled with expanding wax, said compartment having an opening facing said valve seat of said chamber, said regulating threshold-adjustment thermostatic element further including a diaphragm over said opening so to isolate an interior of said compartment.

19. The thermostatic device of claim 1, wherein said regulating threshold adjustment thermostatic element further includes a bag diaphragm having a bell shape.

20. The thermostatic device of claim 1, wherein said regulating threshold adjustment thermostatic element further includes a flat diaphragm.

21. The thermostatic device of claim 1, wherein said duct comprises two abutting portions fixed together such that a mating surface of each of said abutting portions faces a mating surface of the other of said abutting portions, each of said mating surfaces having a cut-out portion for receiving said regulating threshold-adjustment thermostatic element.

22. The thermostatic device of claim 1, wherein said fluid-metering assembly includes at least two valves, and said chamber has at least two valve seats around at least two of said first fluid inlet port, said second fluid outlet port, and said third port, each of said valves being arranged adjacent to a respective one of said valve seats such that when a first one of said valves moves away from a respective one of said valve seats, a second one of said valves moves closer to a respective one of said valve seats.

23. The thermostatic device of claim 1, wherein said heating member is connected by electrical wires to a power source, said power source being connected to a temperature detecting probe.

24. The thermostatic device of claim 23, wherein said power source is further connected to an alarm such that when said temperature detecting probe detects a liquid temperature at or above a predetermined safe temperature, said power source supplies power to said heating element so as to switch said insertion region to a high temperature state and said alarm is activated.

25. The thermostatic device of claim 1, wherein said chamber includes a first fluid outlet port surrounded by a valve seat formed in said duct for receiving a valve, includes a second fluid outlet port surrounded by a valve seat for receiving a valve, and includes a fluid inlet port.

26. The thermostatic device of claim 25, wherein said fluid inlet port communicates with a cooling outlet of an engine for receiving hot liquid from said engine, said first fluid outlet port communicates with an inlet port of a cooling radiator, and said second fluid outlet port communicates with a cooling inlet of said engine via a circulating pump.

27. The thermostatic device of claim 1, wherein said chamber includes a first fluid inlet port surrounded by a valve seat formed in said duct for receiving a valve, includes a second fluid inlet port surrounded by a valve seat for receiving a valve, and includes a fluid outlet port.

28. The thermostatic device of claim 27, wherein said first fluid inlet port communicates with a cooling radiator for receiving cool liquid from said radiator, said second fluid inlet port communicates with a cooling outlet port of an engine, and said fluid outlet port discharges hot liquid, cool liquid, or a mixture of hot liquid and cool liquid based on a position of said second part of said fluid-metering thermostatic element.

* * * * *